US008746747B2

(12) United States Patent
McPherson

(10) Patent No.: US 8,746,747 B2
(45) Date of Patent: Jun. 10, 2014

(54) PIPE JOINTS

(75) Inventor: Terry R McPherson, Charlotte, NC (US)

(73) Assignee: IPS Corporation—Weld-On Division, Compton, CA (US)

(*) Notice: Subject to any disclaimer, the term of this patent is extended or adjusted under 35 U.S.C. 154(b) by 0 days.

(21) Appl. No.: 13/286,028

(22) Filed: Oct. 31, 2011

(65) Prior Publication Data

US 2012/0043752 A1 Feb. 23, 2012

Related U.S. Application Data

(60) Continuation-in-part of application No. 12/045,565, filed on Mar. 10, 2008, now Pat. No. 8,276,636, which is a division of application No. 11/089,222, filed on Mar. 24, 2005, now Pat. No. 7,341,285.

(60) Provisional application No. 60/555,923, filed on Mar. 24, 2004.

(51) Int. Cl.
*F16L 47/00* (2006.01)

(52) U.S. Cl.
USPC ...................................... 285/296.1; 285/294.3

(58) Field of Classification Search
USPC ...................... 285/423, 294.3, 296.1; 156/423
See application file for complete search history.

(56) References Cited

U.S. PATENT DOCUMENTS

| | | | |
|---|---|---|---|
| RE2,342 E * | 8/1866 | Robbins ..................... | 285/296.1 |
| 269,334 A | 12/1882 | Smith | |
| 317,557 A | 5/1885 | Marsden | |
| 339,036 A | 3/1886 | Wilbur | |
| 506,484 A * | 10/1893 | Ewing ........................ | 285/296.1 |
| 615,976 A | 12/1898 | Felsche | |
| 868,349 A | 10/1907 | Lomax | |
| 950,578 A | 3/1910 | Schmidt | |
| 978,346 A | 12/1910 | Yarrow | |
| 1,158,415 A | 10/1915 | Boyle | |
| 1,462,077 A | 7/1923 | Weston | |
| 2,984,504 A | 5/1961 | Boughton | |
| 3,353,563 A * | 11/1967 | Hutton ........................ | 285/295.1 |
| 3,606,401 A | 9/1971 | Schwarz | |

(Continued)

FOREIGN PATENT DOCUMENTS

| | | |
|---|---|---|
| CA | 1028376 | 3/1978 |
| JP | 05-346189 | 12/1993 |
| WO | 9832207 | 7/1998 |
| WO | 2005017006 | 2/2005 |

*Primary Examiner* — David E Bochna
(74) *Attorney, Agent, or Firm* — Myers Bigel Sibley & Sajovec, P.A.

(57) ABSTRACT

A pipe joint for joining pipes composed of materials that are difficult to adhere. The major elements are an extrudable adhesive; a first pipe having a socket with an inside diameter, where the socket has a mouth, a self-centering bottom with a gasket, a cylindrical wall with a plurality of ports, and an inner annular channel. A second pipe has an insertion section with a squared-off end and a rolled groove. The second pipe having an outside diameter that is less than the inside diameter of the socket, where the difference defines a coaxial cavity with a width. The rolled groove serves as a distribution channel while the adhesive is a liquid, and upon curing the solid adhesive functions as a retaining ring. A flanged annular ring, potentially aided by a compression apparatus, caps the cavity, centers the insertion section, and maintains compression. The adhesive includes alkyl-borane-adhesives.

19 Claims, 8 Drawing Sheets

(56) References Cited

U.S. PATENT DOCUMENTS

| | | | | |
|---|---|---|---|---|
| 3,916,502 A | * | 11/1975 | Bagnulo | 285/294.3 |
| 3,960,394 A | | 6/1976 | Hubner et al. | |
| 4,226,444 A | | 10/1980 | Bunyan | |
| 4,523,779 A | | 6/1985 | Knox | |
| 4,647,080 A | | 3/1987 | Sandt et al. | |
| 4,670,207 A | | 6/1987 | Yamada et al. | |
| 4,688,829 A | | 8/1987 | Shioda et al. | |
| 5,022,685 A | | 6/1991 | Stiskin et al. | |
| 5,449,207 A | | 9/1995 | Hockett | |
| 5,486,024 A | | 1/1996 | Dierdorf | |
| 5,795,657 A | | 8/1998 | Pocius et al. | |
| 5,851,036 A | * | 12/1998 | Vanesky | 285/294.3 |
| 5,887,909 A | | 3/1999 | Tokuda | |
| 6,383,655 B1 | | 5/2002 | Moren | |
| 6,436,224 B1 | | 8/2002 | Nishimura et al. | |
| 6,777,512 B1 | | 8/2004 | Sonnenschein et al. | |
| 7,341,285 B2 | | 3/2008 | McPherson | |
| 7,510,623 B2 | | 3/2009 | Lutz et al. | |
| 8,007,012 B2 | * | 8/2011 | Kjolseth et al. | 285/296.1 |
| 8,276,636 B2 | * | 10/2012 | McPherson | 285/296.1 |
| 2003/0044553 A1 | | 3/2003 | Ramanathan et al. | |
| 2003/0047268 A1 | | 3/2003 | Korchnak et al. | |
| 2006/0191623 A1 | | 8/2006 | Lutz et al. | |
| 2006/0266476 A1 | | 11/2006 | Sehanobish et al. | |
| 2009/0014121 A1 | | 1/2009 | McPherson | |

* cited by examiner

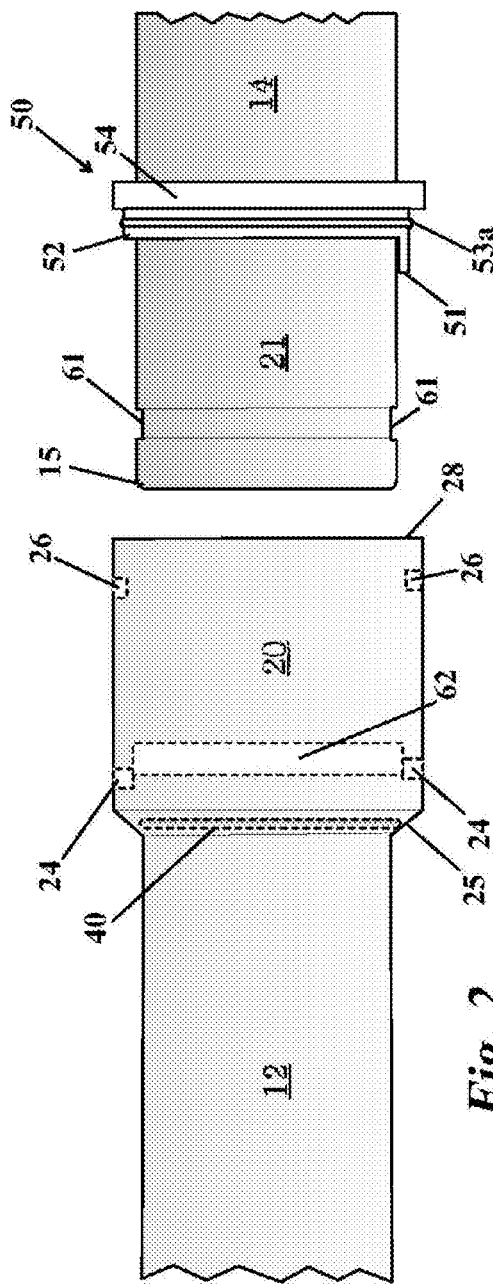
*Fig. 2*
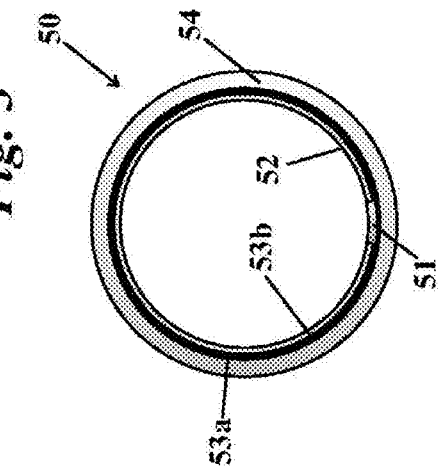
*Fig. 3*
*Fig. 4*
*Fig. 5*

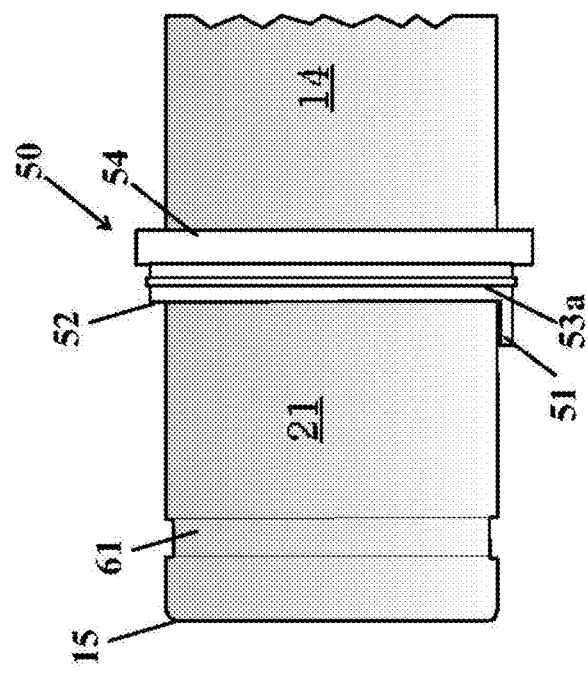
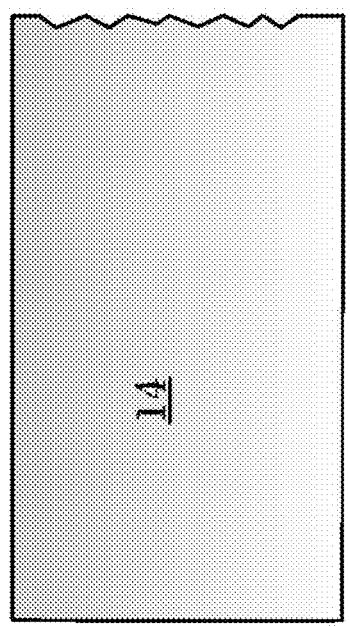
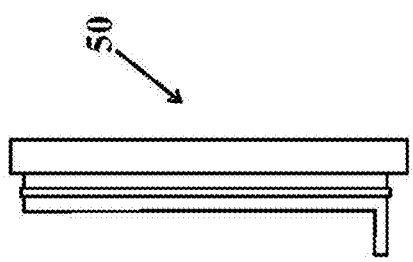
*Fig. 6*

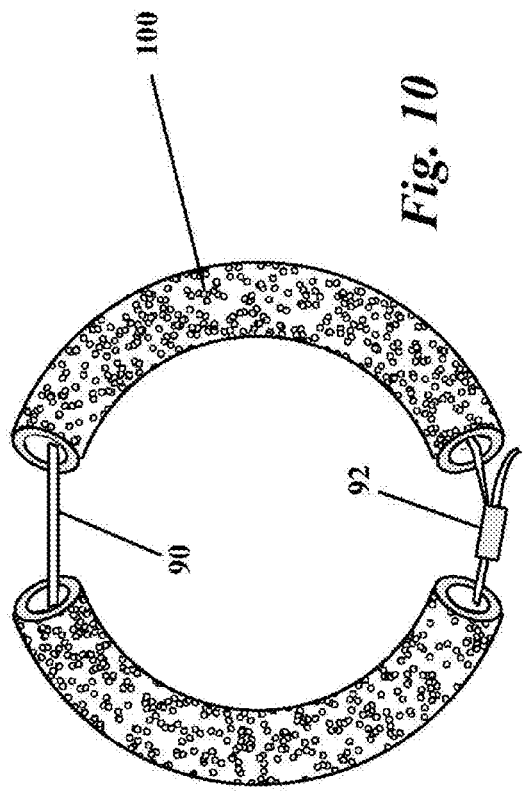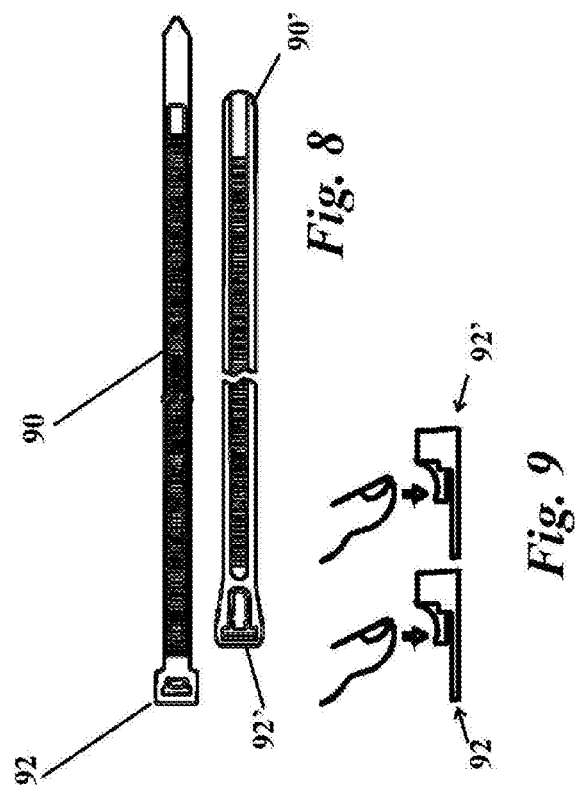

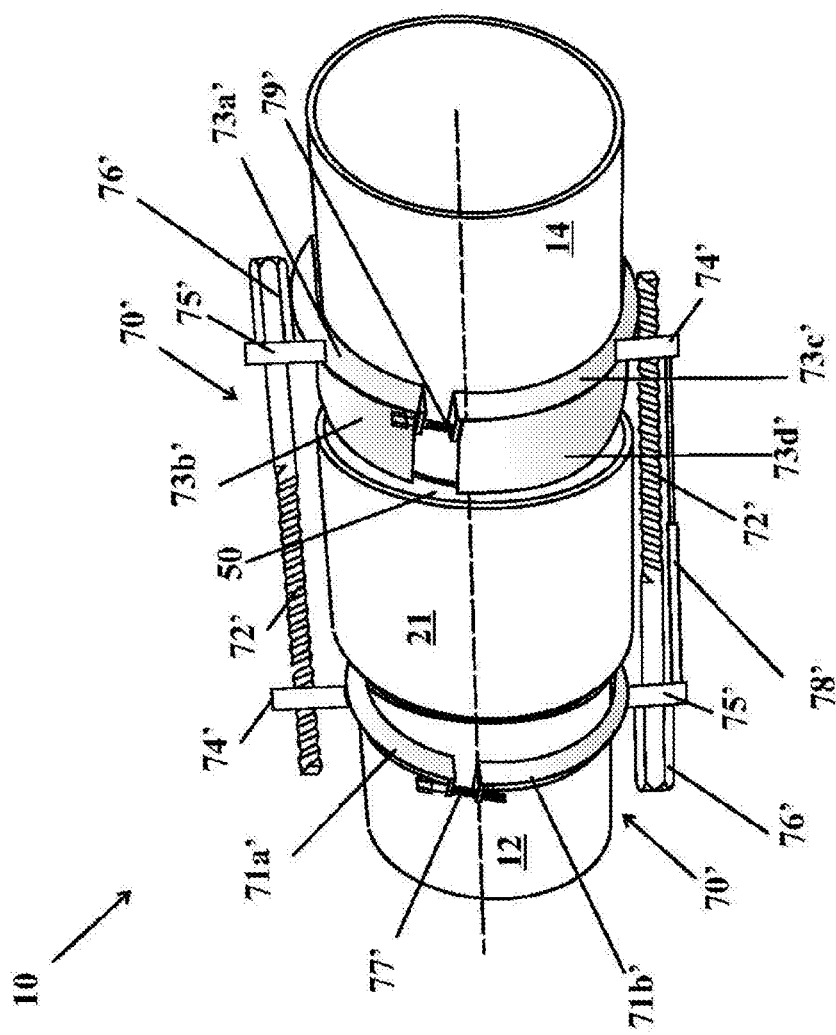

PIPE JOINTS

CROSS REFERENCE TO RELATED PATENT APPLICATION

This application is a continuation-in-part of currently pending patent application Ser. No. 12/045,565 filed on Mar. 10, 2008, and issued as U.S. Pat. No. 8,276,636 on Oct. 2, 2012, which is a divisional application stemming from patent application Ser. No. 11/089,222 filed on Mar. 24, 2005 and issued on Mar. 11, 2008 as U.S. Pat. No. 7,341,285. Patent application Ser. No. 11/089,222 claimed the benefit of the priority filing date of the provisional patent application Ser. No. 60/555,923, originally filed on Mar. 24, 2004; and the continuation-in-part application also claims the benefit of the original filing date of Mar. 24, 2004.

BACKGROUND OF THE INVENTION

1. Field of the Invention

The mention relates generally to a method for joining pipes, and more particularly to a method and a system for joining pipes comprised of low surface energy materials, such as HDPE (high density polyethylene), PEX (cross linked polyethylene), and PVDF (polyvinylidene difluoride). Low energy surface materials are generally to be referred to as olefinic materials within the scope of the disclosure and claims of this application.

2. Prior Art

A process called chemical fusion (employing an adhesive) is used to join olefinic plastic pipes comprised of low surface energy materials, such as HDPE (high density polyethylene), PEX (cross linked polyethylene), and PVDF (polyvinylidene difluoride). Olefinic plastic pipes such as those previously mentioned cannot be joined using the same technology, to join, for instance, PVC, ABS and CPVC pipes. Pipes made of PVC or ABS or CPVC are typically joined using a solvent cement, where a solvent cement is a solution, emulsion or dispersion of the respective polymer in a volatile etching solvent. An example of a volatile etching solvent is a blend of THF, toluene, MEK. The solvent etches the surface of the pipe, and then dries leaving a coating of the cement and a partial fusion of the surfaces of the joined pipes. When olefinic pipes, such as those previously described, are attempted to be adhered in a similar fashion, the joint bond is unsatisfactory. The low surface energy olefinic plastics are resistant to solvent etching, and the residual adhesive cement does not satisfactorily adhere the two surfaces. Olefinic pipes are typically joined using mechanical means, such as threaded ferrule couplers, Victaulic couplings (e.g. clamps), or joined using heat fusion. With heat fusion, a current is induced in a wire coated with an appropriate olefinic material. The coated wire is wrapped around the pipe, between the inserting pipe section and the socket joint. The wire is inductively heated, which causes the olefinic coating to melt and fuse with the olefinic pipe.

A review of various alkyl borane adhesive systems as they relate to forming pipe joints follows.

U.S. Pat. No. 5,795,657 discloses a two part acrylic adhesive using an organo borane polyamine complex. Various organo borane polyamines, admixed with an oligomeric blend of acrylics, are tested against polyethylene, polyproplene, and Teflon.

In 3M's U.S. Pat. No. 6,383,655, they further address adhesives suitable for low energy surfaces, where the adhesives cure at room temperature. A low energy surface is defined as having a surface energy less than 45 mJ/m.sup.2, more typically less than 40-45 mJ/m.sup.2, or less than 35-40 mJ/m.sup.2. Cited as examples are polyethylene, polypropylene, acrylonitrile-butadiene-styrene, polyamide and fluorinated polymers such as polytetrafluoroethylene (Teflon™). Using the system described in U.S. Pat. No. 6,383,655 the adhesive is cured at room temperature. The substrates tested were polypropylene, polytetrafluoroethylene and high-density polyethylene. Over lap shears for the high-density polyethylene were up to 700 psi and 800 psi for the polypropylene. Over lap shear for fluorinated polyethylene was reported anywhere from 160 to 350 psi. The amines used in U.S. Pat. No. 6,383,655 were substantially shorter than the amines used in U.S. Pat. No. 5,795,657, suggesting that greater cross-linking probably occurred, and that the cohesive force of the adhesive is higher. Anticipated applications mentioned include adhesives, bonding materials, sealants, coatings, and injection molding resins. The disclosed adhesive systems may also be used as matrix resins in conjunction with glass, carbon, and metal fiber mats, such as those used in resin transfer molding operations. They also may be used in encapsulants, potting compounds, electrical components, printed circuit boards, and the like. There was no mention of the use of the adhesive for adhering pipe joints. Of interest is that when using the described adhesive system, they (3M) found it useful to add a thickener such as polybutyl methacrylate (col 11, line 56). This is in contrast to a potential issue for the instant invention, in that a low viscosity adhesive is desired.

U.S. Pat. No. 4,670,207 addresses a number of issues associated with joining olefinic pipe using a socket joint bonding method. According to the reported prior art, wherein the walls of socket and pipe are substantially straight, the insertion of the pipe into the socket produces a bead of adhesive that is expressed outward, and also produces a bead of adhesive that is forced inward. The inward bead can actually partially occlude the pipe, but more importantly is a potential source for contamination. A purported solution to the problem is using a socket and pipe insert where both have tapered walls. Reputedly, the tapering prevents expressing a bead of adhesive when the pipe is inserted into the socket. Reportedly, tapering the inner circumferential surface of the socket portion of the joint and the outer circumferential surface of the end portion of the pipe results in higher bonding pressure, and consequently a high bond strength can be obtained. While the tapering may help in aligning the pipes, in fact, it still would not solve the problem of keeping the end of the inserted pipe coaxial (concentric) with the socket joint, which is a feature of the invented unique pipe joint.

U.S. Pat. No. 5,449,207 is included to show that the concept of using adhesive delivery systems to pump the adhesive into the joint has previously been addressed. While not explicitly showing a similar type of coupling device, nor the use of a similar adhesive (alkyl borane adhesive), the patent does illustrate the use of an extruded adhesive.

U.S. Pat. No. 4,688,829 is included only to illustrate in a very general way a means of aligning the inserting pipe concentrically into the socket joint. In FIG. 3 of U.S. Pat. No. 4,688,829, there is a first annular ring 12 and a second annular ring 13, which align 7 the inserting pipe into 4, the socket joint.

In U.S. Pat. No. 6,436,224, Nishimura describes a silicon compound used in a solvent, typically toluene, to augment electro fusion (EF, which is another name for heat fusion). The silicon compound acts somewhat like a flux and a sealant. It is especially useful if the pipe has becomes oxidized or surfaces are contaminated with sand or some other loose material which prevents successful electro fusion.

Dow chemical has a pair of published patent applications (US Publication 2003/0047268A1 and 2003/0044553A1) on file that utilize alkyl borane adhesives. The applications discuss the adhesive composition, as they relate to methods to repair fuel tanks.

In Canadian Patent 1,028,376 to Silver et al., Silver teaches a pipe joint having a male joint member and a female joint member, where the end of the male member is tapered and the receiving female member necks down. The two are joined with what approximates a press fit at the male end. The mouth has a ferrule shaped flanged annular cap.

What is needed is a pipe joint suitable for joining pipe joints that hereto before have not been successfully joined using conventional pipe non-metallic pipe cements.

Further, what is needed is a pipe joint that can, employ very high solids adhesives, as solvent based adhesive systems produce air emissions, which are progressively being regulated out of existence.

SUMMARY OF THE INVENTION

The invention, in the broadest sense, is a pipe joint that is joined using an extrudable adhesive, where the extrudable adhesive is particularly suitable for joining non-metallic pipes. Examples of non-metallic materials used in the fabrication of pipes are PVC, chlorinated PE, vinyl acetate, PVDC, CPVC, silicone, ABS, acrylic polymers, fluorinated polymers such as polyvinylidene difluoride (PVDF), ethylene propylene diene-monomer (EPDM), and olefinic pipe materials. Olefinic pipes are commonly formed from high density polyethylene (HDPE), cross-linked polyethylene (i.e., PEX and ionomers), polypropylene and polytetrafluoroethylene (PTFE). The extrudable adhesive is selected for olefinic pipes that are principally formed of a polymeric material having a low surface energy and are substantially impervious to solvents.

An aspect of the invention is that the pipe joint is, suitable for use with adhesives that can be dispensed with little or no solvent. The invented joint does not require an adhesive to etch the surface of the pipes, nor an adhesive that effects fusion of the materials by solvation nor by thermal melting. The joint is suitable for high or 100% solids formulations, where the adhesive has one or more parts. For instance, a hot melt adhesive is a 100% solids formulation that is one part adhesive, cyanoacrylates are one-part reactive adhesives that cure on contact with mated surfaces through a reaction, where, in some cases, reaction can be initiated by surface moisture or oxygen. Examples of two part adhesives include epoxy-cyanoacrylate, urethane-cyanoacrylate or alkyl-borane adhesives, wherein combining the parts, initiates reaction, which cures the adhesive to a solid. Many two part adhesives are dispensed at very high solids, up to being solvent free.

In one aspect of the invention, the invention includes a male joint member and a female joint member, where the members are joined either as a pipe insertion section and a pipe socket, or as coupled pipe sockets, where each socket is joined with a pipe insertion section. In the joint, both prior to the joining and after joining the male joint member is held in compression against the female joint member. Several adaptations are disclosed as to how the compression is maintained. Other combinations of pipe ends and pipe sockets that produce an assembled joint of this type, for instance angular joints, are anticipated. Whatever the combination, the joint on pre-assembly has a coaxial cavity having a width, where the width is determined by the difference between the inside diameter of the pipe socket and the outside diameter of the pipe insertion section, and the insertion section is concentric with the pipe socket.

The extruded adhesive can be injected from cartridge or bulk metering and mixing application systems, including bulk refillable types that are freestanding or portable systems (including backpack systems). Mixing apparatus include dynamic mechanical mixers as well as static mixers. The application system includes an apparatus for quickly connecting, delivering an extruded adhesive to a unadhered pre-assembled joint, and disconnecting after delivering a desired quantity of adhesive. It is anticipated that pressures in excess of 1000 psi may be generated, and mechanical assistance will be required for some joints. It is further anticipated that most of the pipe joints will be formed in the field.

In a variation of the invented pipe joint, the pipe joint includes a first pipe with a socket having an inside diameter. The socket has a rim, a self-centering bottom, a substantially cylindrical wall, and typically at least one port, which is an opening through the cylindrical wall. The socket can contain a seated o-ring/gasket to sealedly compensate for variation of an end of the insertion section of a second pipe and the bottom of the socket. Another aspect of the variation is that the insertion section has an squared end that can be slightly tapered to rest squarely on the seated o-ring gasket. The second pipe has an outside diameter that is less than the inside diameter of the socket, where the difference in diameters defines a coaxial cavity having a desired width (i.e., the width is the thickness of the adhesive bond-line). The second pipe is centered concentric to the rim of the socket with a flanged annular ring. The flange of the annular ring caps the socket's rim. As will be discussed in greater detail, variations of the flanged annular ring can compress the seated o-ring/gasket.

Either in the field or during manufacture the insertion section optionally can be tooled to have a rolled groove that is substantially parallel to the square end, and typically positioned proximate to at least one port in the socket wall. The socket can include an opposing inner annular channel in the cylindrical wall. Taken together the an inner annular channel and the rolled groove serves two important functions. It creates a distribution channel having less resistance through which adhesive can be injected, and then, flow through the coaxial cavity. Secondly, on curing to a solid, the solid adhesive functions mechanically similar to a retaining ring, therein restraining movement of the second pipe relative to the socket.

An unadhered pre-assembled joint is typically held in position by a compressing apparatus, such as a clamp, that aligns and positions of the elements of the pipe joint in compression. On pre-assembly, the inner annular channel of the socket is aligned substantially opposite the rolled groove in the insertion section creating the distribution channel that feeds to the coaxial cavity. The coaxial cavity is capped by the flanged annular ring, where the annular ring has an inside diameter that enables it to be slid over the second pipe and a thickness that is comparable to the coaxial cavity width, and where the flange has a width that is sufficient to cap the mouth of the socket.

In one variation of the flanged annular ring, it can have one or more longitudinal extensions, where a longitudinal extension functions as a shut-off valve when the ring extension is positioned/rotated such that the longitudinal extension blocks a port. This would be the case when the port is potentially an undesired outlet for adhesive, when the coaxial cavity is being filled.

The joint is fully formed when the extrudable adhesive has changed to a solid material that substantially fills the coaxial space and the opposing channels forming a retaining ring. The solid adhesive material serves as a retaining ring as well as the adherent for the adhered pipes. Mechanistically, the retaining ring and adhered pipes share the shear stress on the joint when the joint is pressurized, thusly assuring that even under conditions where there would be adhesive shear failure, the pipes may still remain joined, and the joint would continue to sealedly function.

As previously discussed the unadhered pre-assembled joint is held in position by a compressing apparatus, that aligns and positions the elements of the pipe joint in compression. The compressed unadhered pre-assembled joint has ports that are in fluid communication with the distribution channel and the coaxial cavity that is to receive the extruded adhesive. Typically, after being pre-assembled, the coaxial cavity of the unadhered pre-assembled joint contains an ambient fluid, typically air, but in the case of underwater assembly, water would be the ambient fluid, and in the case of assembly in outer-space the ambient fluid would be defined by the ambient conditions in outer-space. The extruded adhesive is typically pumped by an extruder into the coaxial cavity of the unadhered pre-assembled joint through an inlet port that feeds to a lower portion of the unadhered pre-assembled joint. If the pre-assembled joint has a vertical orientation, then the lower portion would be through the inlet port in the socket located near a bottom position of the unadhered pre-assembled joint. If the pre-assembled joint has a horizontal orientation, then the lower portion would be through the inlet port in the socket located on a lower side position of the unadhered pre-assembled joint. The preferred inlet port can be influenced by a pipe fitter through the selection of how the joint is pre-assembled, as there are multiple degrees of freedom in the axial position of the pipe insertion section and the pipe socket. Normally, the inlet port is selected such that as adhesive is extruded into the coaxial cavity it displaces the ambient fluid upward and out of one outlet port, therein completely filling the coaxial cavity. More than one inlet port can be used, but typically there is only one outlet port used to exhaust the ambient fluid, as some back pressure is desirable. The unadhered pre-assembled joint can be flushed with an inert gas, or other suitable fluid, causing entrained air and water vapor to be exhausted from the coaxial cavity. The flush would enable air and water sensitive adhesives to be used without concern of premature cure.

Extruded adhesive is added at a rate that is slow enough such that the compressing apparatus does not fail, therein allowing adhesive to enter in a bore of the pipe joint. The coaxial cavity is substantially filled with adhesive when ambient fluid is no longer being exhausted, as evidenced by the presence of the extruded adhesive. At this point, all inlet and outlet ports can be closed off. This can be effected using one or more techniques, including removing the extruder and allowing the adhesive to form a plug, or curing the adhesive in the ports with time and or heat and or a reactive component or plugging the ports with an ancillary mechanical device such as a pressure sensitive tape, a cap or screw, a Luer lock device, and a valve. The compression apparatus is left in place at least until a fully formed pipe joint, wherein the adhesive is cured.

BRIEF DESCRIPTION OF THE DRAWINGS

The foregoing and other objects will become more readily apparent by referring to the following detailed description and the appended drawings in which:

FIG. 2 is a side view of a first pipe having a socket;

FIG. 3 is a side view of a second pipe where the end of the pipe has been squared and tooled to have a rolled groove, and fitted with a flanged annular ring;

FIG. 4 is a planar view of the flanged annular ring wherein the annular ring portion has an outside circular protrusion and an inside circular protrusion;

FIG. 5 is an end-on view of the first pipe having a socket illustrated in FIG. 2;

FIG. 6 is a side view of the second pipe being fitted with a flanged annular ring tooled to have a rolled groove;

FIG. 8 is a side view of variations of cable straps having a releasable buckle, wherein the cable straps are used to secure the compression apparatus;

FIG. 9 is a side view of illustrating how the releasable buckle is positioned to the release position;

FIG. 10 is a top view of tubular rubber elements cinched together with a cable strap, wherein the tubular rubber is selected to generate high frictional resistance against olefinic pipes composed of materials such as high density polyethylene (HDPE), cross-linked polyethylene (i.e., PEX and ionomers), polypropylene and polytetrafluoroethylene (PTFE);

FIG. 13 is a perspective side view of an embodiment of the unadhered pre-assembled pipe joint illustrating another compression apparatus, wherein the compression apparatus includes at least two split-clamps that engage the pipes and at least two screw clamps secure the elements of the unadhered pre-assembled pipe joint in compression.

DETAILED DESCRIPTION OF THE INVENTION

Figure 1:
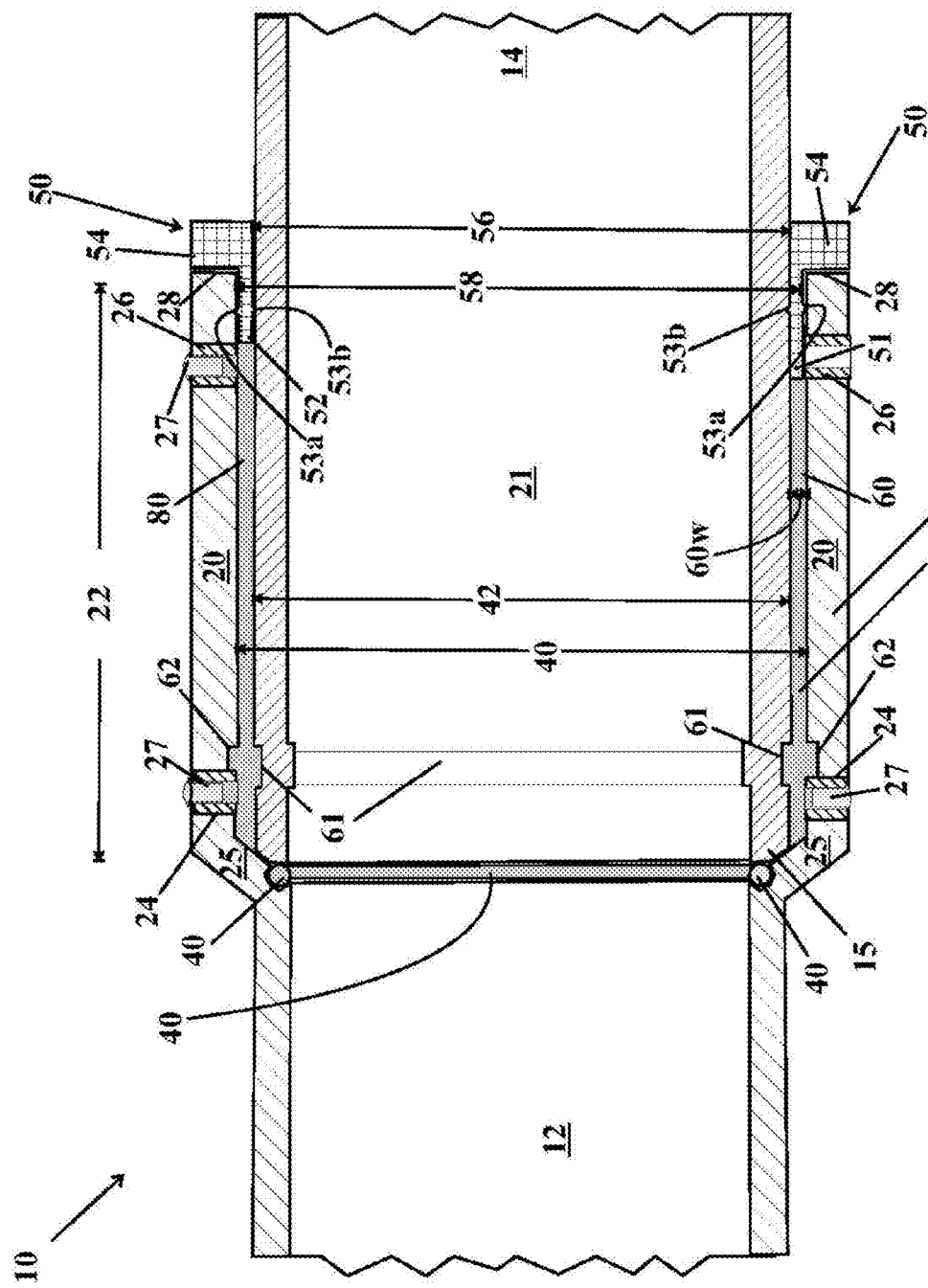
FIG. 1 is longitudinal cross-sectional view of an embodiment of the invented pipe joint.

The invention, as illustrated in the drawings is an adhesively connected pipe joint 10. Referring to the longitudinal cross-sectional view shown in FIG. 1, an illustrated embodiment of the joint 10 has a first pipe 12 with an enlarged end section that is a socket 20. The socket 20 is substantially cylindrical in shape. The socket 20 has a self-centering bottom 25 having a seated gasket/o-ring 40 and an opening mouth having a rim 28. The socket 20 has a length 22 as measured from the rim 28 to the bottom 25, where the bottom is slanted to induce self-centering. The length 22 is substantially a cylindrical wall 29 having elements that determine an adhesive bond line between the socket 20 and a second pipe 14. The socket 20 has a plurality of ports 24,26. Ports closest to the bottom 25 are numbered 24, and ports closest to the rim 28 are numbered 26. As is evident from the drawing, an inside diameter 40 of the socket 20 is greater than the outside diameter 42 of an insertion section 21 of the second pipe 14. The socket dimensions could be selected to join a larger pipe to a smaller pipe and vice versa.

A flanged annular ring 50 centers the second pipe 14 in the socket 20 of the first pipe 12. An annular ring portion 52 of the ring 50 substantially has, a thickness with a width ((outside diameter 58−inside diameter 56)/2) that is comparable to half the difference between the inside diameter 40 of the socket and the outside diameter 42 of the second pipe 14. Typically, during pre-assembly the flanged annular ring 50 is positioned on the second pipe 14, and then after the insertion section is pushed to the bottom of the socket, the flanged annular ring 50 is then pushed until the flange portion 54 contacts the rim, centering the second pipe in the socket. In the illustrated embodiment, the annular ring portion 52 of the flanged annular ring 50 furthermore has an outside circular protrusion 53a and an inside circular protrusion 53b and an extension 51 After pre-assembly the outside circular protrusion 53a further frictionally engages the inside diameter 40 of the socket of the first pipe 12, and frictionally engaging the inside circular protrusion 53b the outside diameter 42 of the second pipe 14. The outside circular protrusion 53a and the inside circular protrusion 53b can be used to maintain some compression of the second pipe 14 self-centering bottom 25 having a seated gasket/o-ring 40, as the protrusions frictionally hold the flanged annular ring 50 to both the socket 20 and the second pipe 14.

Temporarily, the inside diameter 56 of the flanged annular ring 50 can be increased relative to outside diameter 42 of the second pipe 14 by raising the temperature of the flanged annular ring 50 above the second pipe 14, therein making it easier to slide the flanged annular ring 50 on the second pipe 14. Also temporarily the difference of the inside diameter 40 of the socket 50 of the first pipe 12 relative to the outside diameter 58 of the flanged annular ring 50 can be increased by increasing the temperature of the socket 50, for instance by immersing the socket in hot water, therein making it easier to push the flanged annular ring 50 until the flange contacts the rim of the socket. Hot air guns and compression apparatus can be employed to facilitate pre-assembly.

In the illustrated embodiment, the inside diameter 40 of the socket 20 of the first pipe 12 is larger than the outside diameter 42 of the second pipe 14, and when inserted together they create a coaxial cavity 60 having a width 60w, which defines the thickness (i.e. bond line) of the received extruded adhesive. The adhesive 80 is shown in light grey diorite. A desired thickness of bond line is dependent on the particular adhesive, and the forces of shear. The coaxial cavity 60 is filled from the bottom up through a port that is an inlet, such that any entrapped fluid, such as air, is displaced, exiting through another port that is an outlet. In the illustrated embodiment, there are four ports, all are currently blocked, three with a stop 27, and one by an extension 51 of the flanged annular ring 50.

The insertion section 21 has a squared end 15 that is slightly tapered to rest squarely on the seated o-ring/gasket 40.

The embodiment in FIG. 1 illustrates that the insertion section 21 of the second pipe also is tooled to have a rolled groove 61 that is substantially contiguous with the coaxial cavity 60, and parallel to the squared end 15. As illustrated it is proximate to the ports numbered 24, which are shown in the figure as being stoppered with plugs numbered 27. The rolled groove 61 can be tooled into the pipe in the field using a portable roll groover apparatus (such as Reed's RG26S). Also, the rolled groove as shown is aligned with an opposing channel 62 in the socket wall. The opposing inner annular channel 62 in the socket wall can be formed using an expander, or other suitable means. The rolled groove 61 and opposing channel 62 taken together form a distribution channel for the adhesive while it is liquid during injection, such that resistance is lower and the adhesive can more easily flow through the distribution channel and then from the distribution channel into the coaxial cavity. On curing to a solid, the solid adhesive forms a rigid element that functions mechanically similar to a radial retaining ring, which are often referred to as "C" or "E" rings. Radial rings restrain movement of the second pipe relative to the socket.

Referring to FIG. 2, which is a side view of the first pipe 12 having a socket 20 prior to pre-assembly, the socket 20 size is selected to have the optimum diameter for joining with a second pipe. As previously noted the applicant has observed that there is a correlation of adhesive failure to the width (see 60w in FIG. 1) of the bond line of the adhesive. If the bond line is too wide, the mode of failure is by cohesive failure, as measured by lap shear tests, and therefore there is a lower threshold of performance in adhering pipe joints. Ports 24,26 are shown in ghost, as they are not necessarily visible. The opposing channel 62 in the socket 20 is also shown in ghost, as it would not necessarily be visible. The seated gasket/o-ring 40 in the bottom 25 is shown in ghost as it would, not be visible from this view. The edge of the rim 28 is visible.

Referring to FIG. 3, which is a side view of the second pipe 14, the second pipe 14 has an insertion section 21 with a squared slightly tapered end 15 and a rolled groove 61. The pipe is fitted with a flanged annular ring 50. The flanged annular ring 50 has a flanged portion 54 and an annular ring portion 52. The ring portion has a section that is an extension 51, which is sufficiently long to serve as a shut-off valve for a port 24 or 26. The illustrated annular ring portion 52 also has an outside circular protrusion 53a and an inside circular protrusion 53b. Only the outside circular protrusion 53a is visible in this view, as the inside circular protrusion 53b are against the pipe, and obscured from view by the annular ring portion 52. Recall, as shown in FIG. 1, the outside circular protrusion 53a frictionally engages the inside diameter 40 of the socket of the first pipe 12, and the inside circular protrusion 53b frictionally engages the outside diameter 42 of the second pipe 14. The plastic pipe, under force, will slightly deform allowing the flanged annular ring 50 with the protrusions to essentially snap into position, allowing them to be positioned. The outside circular protrusion 53a and the inside circular protrusion 53b can then be used to maintain some compression of the second pipe 14 on the self-centering bottom 25 having, a seated gasket/o-ring 40, because the circular protrusions 53a,53b frictionally hold the flanged annular ring 50 to both the socket 20 and the second pipe 14. Therefore the second pipe 14 in compression against the seated gasket/o-ring 40 and the flanged annular ring 50 is in compression frictionally engaged by the inside diameter 40 of the socket of the first pipe 12.

The flanged annular ring 50 shown in FIG. 2 is illustrated in the planar view of FIG. 4. The annular ring portion 52 has an outside circular protrusion 53a and an inside circular protrusion 53b. The outside circular protrusion 53a is selected to frictionally engage the socket 20 at the rim 28. The inside circular protrusion 53b is selected to protrude so that it frictionally engages the insertion section 21 of the second pipe 14. The annular ring portion 52 has an extension 54, which can serve as a shut-off valve to a port. See FIG. 1 for an illustration. The flanged portion 54 is wide enough to cap the socket rim 28.

Referring to FIG. 5, which is an is an end-on view of the first pipe 12 having a socket, as illustrated in FIG. 2; The bottom 25 is slanted and self-centering, and it has a gasket/o-ring 40 to insure a seal under pressure. The illustrated gasket/o-ring 40 is composed of a non-swelling, substantially inert performance rubber, such as ethylene propylene diene monomer (EPDM, silicone, fluorinated rubbers (Viton® fluoroelastomers a product of Dupont)) and ethylene acrylic elastomers (Vamac® a product of Dupont), and combinations thereof.

FIG. 6 illustrates the second pipe being fitted with a flanged annular ring 50 and tooled to have a rolled groove. After squaring the end 15, a rolled groover tool (not shown) is attached to the pipe using the squared end as a guide and the depth of a boss roller is set. Typically the rolled groover tool is rotated around the pipe with several turns, successively making the rolled groove deeper. The flanged annular ring 50 is normally positioned on the pipe prior to forming the rolled groove. After forming the rolled groove 61, the rolled groover tool is removed and the insertion section 21 is cleaned to remove and dirt or grease, which could effect adhesion. Green, fast drying solvents, like ethanol and acetone, and other solvents such as THF (tetrahydrofuran) can be employed to facilitate cleaning and creating a dry surface. It is desired that on removal of the rolled groover tool that the pre-adhered assembly of the joint be soon afterwards. Olefinic pipes materials usually have some memory, and will tend to partially recover with time. The extruded adhesive will have some shrinkage as it cures or cools, and the shrinkage will be at least partially compensated for by a shallowing change in the depth of the rolled groove.

Figure 7:
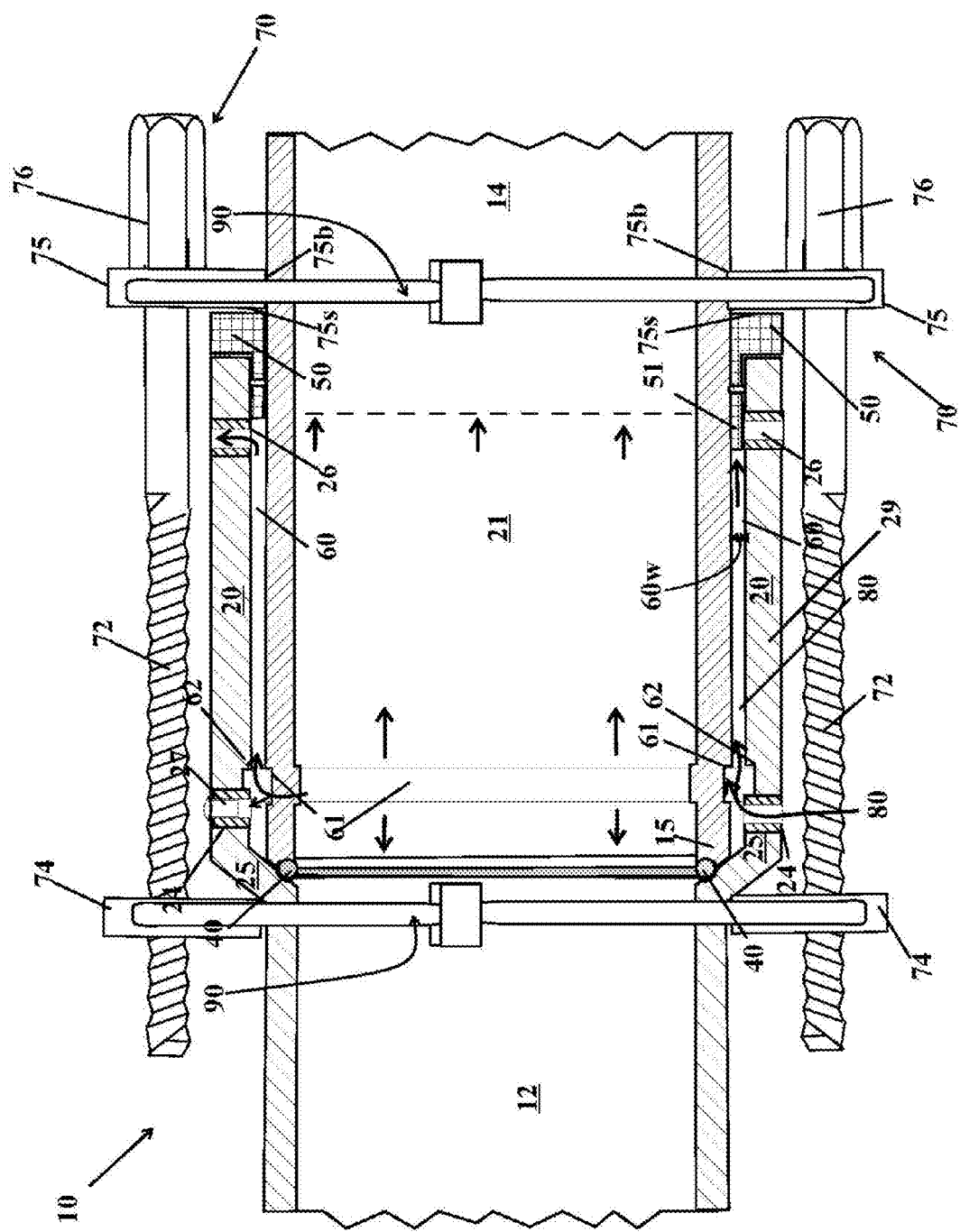
FIG. 7 is an longitudinal cross-sectional view of an embodiment of the unadhered pre-assembled pipe joint illustrating a compression apparatus and a possible flow path of adhesive extruded into the pre-assembled pipe joint.

FIG. 7 is an longitudinal cross-sectional view of an embodiment of the unadhered pre-assembled pipe joint illustrating a compression apparatus 70 and a possible flow path of the adhesive 80 extruded into the pre-assembled pipe joint 10. The compression apparatus 70 is a screw clamp with a threaded screw 72 with a head 76. The head 76 is mounted in a block 75 has a bottom 75b flush to the second pipe 14 and a side 75s that that is pressed against the flanged annular ring 50. The screw 72 moves tightens an adjustable block 74. As the compression apparatus 70 is tightened the block 75 applies pressure to the flanged annular ring 50 and the adjustable block 74 applies pressure to the bottom 25 of the socket 20. The compression apparatus 70 has at least one element that pulls the compression apparatus 70 toward the pipes 12,14. In the illustrated embodiment the element that pulls the compression apparatus 70 to the pipes 12,14 is at least one cable strap 90, that can be cinched. Block 75 is pressed against the second pipe 14 and the flanged annular ring 50, enabling compression, of both the flanged annular ring and the second pipe.

In is anticipated that other clamping elements as shown in FIG. 13 can be used, but cable straps are advantageous because they are inexpensive and depending on the size and material, usually stainless steel or nylon, they can be readily adapted to the compression apparatus 70. The block 75 and the block 74 can be fitted with rubber pads or teeth (not shown) such that as the blocks 74,75 are tightened against the pipes using the cable straps 90, the blocks 74,75 produce more frictional resistance, and therefore can be adjusted to apply more compressive force. This is a very important consideration, because the tighter the pre-adhered assembly, the more pressure that can be used to extrude the adhesive into the coaxial cavity and the distribution channel 61,62; and the faster the adherent joint can be formed. Recall on solidification the distribution channel forms a retaining ring. Following extrusion, the adhesive is given time to cure to a solid.

Shown as thick arrows in FIG. 7 is the flow path of the adhesive 80 when it is injected into distribution channel 61,62 through the bottom port 24, unlike top port 24 that is blocked by plug 27. The adhesive exits the coaxial cavity 60 through opposing port 26, as bottom port is closed by shut-off valve 51.

FIG. 8 is a side view of variations of cable straps 90 having a releasable buckle 92, wherein the cable straps are used to secure the compression apparatus. The illustrated straps are sized for the diameter of the pipe. Typically, nylon straps are usually left in place or removed by severing them. Stainless steel are typically reused.

Referring to FIG. 9, which is a side view that illustrates that straps having a strap with a releasable buckle are release by depressing a cog on the buckle.

Referring to FIG. 10, which is a top view of a tubular rubber element 100 cinched together with a cable strap 90. The tubular rubber is selected to generate high frictional resistance against olefinic pipes composed of materials such as high density polyethylene (HDPE), cross-linked polyethylene (i.e., PEX and ionomers), polypropylene and polytetrafluoroethylene (PTFE). The tubular rubber element 100 is, sized to have a bore that can accommodate the appropriate cable strap. The Durometer of the rubber is generally selected such that there is some flattening against the pipe as the strap is cinched, as this increases braking if the tubular rubber element 100. It is anticipated that the tubular rubber element 100 composition could include an abrasive layer to further enhance frictional resistance.

Figure 11:
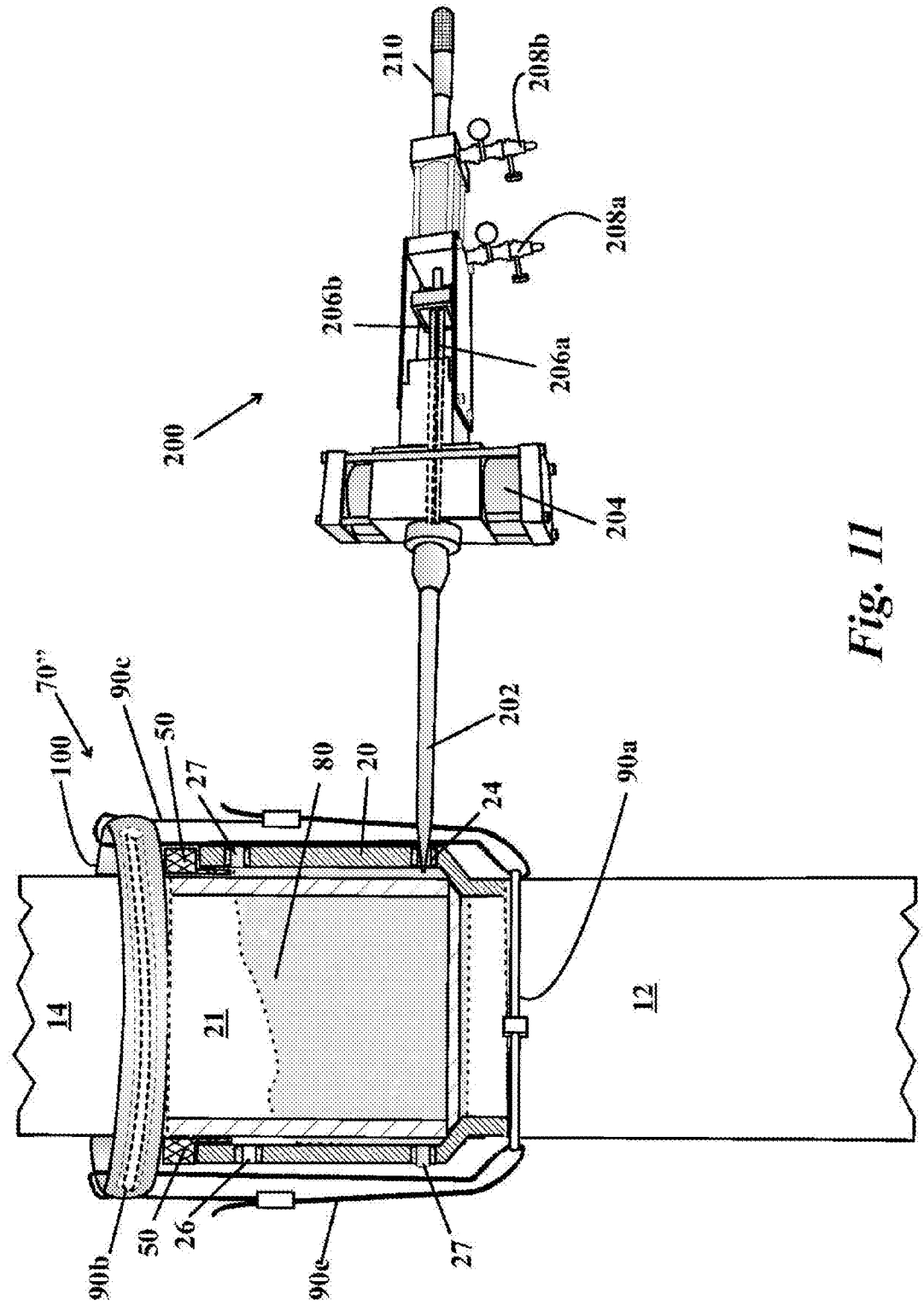
FIG. 11 is a partially cut-away side view of a unadhered pre-assembled pipe joint compressed using a system of cable straps, where the joint is being filled with adhesive using a portable mechanical adhesive delivery apparatus, wherein the portable mechanical adhesive delivery apparatus can deliver a total designated amount of a specified mixed ratio of a two part adhesive, at a specified rate and at a specified pressure.

As shown in FIG. 11, cable straps 90 and tubular rubber element 100 can be joined to form another embodiment of the compression apparatus 70". A tubular rubber element 100 cinched to second pipe 14 with cable strap 90b, therein forming a substantially stationary first collar. Cable strap 90a is cinched around the socket 20 of pipe 12 forms a substantially, stationary second collar. Compressive forces are generated by two or more offsetting longitudinal cable strap 90e, 90c, which loop around both the cinched tubular rubber element 100 (first collar) and cable strap 90a (second collar). The compression apparatus 70" can be quickly attached, adjusted and removed by cutting or releasing the cable straps.

FIG. 13 is another embodiment of the compression apparatus 70"shown in FIG. 7 which is a clamping mechanism that maintains the elements of the unadhered pre-assembled pipe joint in compression. The blocks 74', 75' are mounted to a first adjustable split collar-like element 71a', 71b' for the first pipe 12, and a second adjustable split collar-like element 73a', 73b, 73c' 73d' for the second pipe 14. The 71a', 71b'adjustable collar-like element is tightened with threaded element 77', and similarly the second adjustable split collar-like element 73a', 73b, 73c' 73d' is tightened with threaded element 79'. The second adjustable split collar-like element in one embodiment has a wider base 73b, 73d' that is seated adjacent to the flanged annular ring 50 and grips the second pipe, such that as compression apparatus 70", where as threaded screws 72" of the threaded clamp are tightened the first pipe 12 and the second pipe 14 are compressed. Furthermore, the flanged annular ring is forced into the space between the socket 21 and the second pipe. To speed up the process of tightening the clamp 70", in the illustrated embodiment the top head 76' is opposing the bottom head 76', so that a user can use both his left and right hands simultaneously. The illustrated embodiment also has a telescoping guide 78' which keeps the clamping device at least partially assembled, and therefore ready for use. The back side of adjustable split collar-like elements are not visible, but they can be either hinged or connected with a connecting means like the threaded element 77'.

As shown in FIG. 11, the partially cut-away side view of an unadhered pre-assembled pipe joint is being filled with adhesive 80 using a portable mechanical adhesive delivery apparatus 200, wherein the portable mechanical adhesive delivery apparatus can deliver a total designated amount of a specified mixed ratio of a two part adhesive, at a specified rate and at a specified pressure. In the illustrated embodiment the portable mechanical adhesive delivery apparatus 200 has a static mixer in the delivery tapered tube 202. The delivery apparatus 200 uses rod displacement metering technology. The tip of delivery tapered tube 202 typically is tapered about nine degrees, which is comparable to a Luer lock device. The delivery tube is disposable. Elongate chambers 206a,206b contain a ratio volume of adhesive, that when triggered the parts of adhesive are delivered at a specified rate and pressure via piston assembly 204. The illustrated embodiment is pneumatically driven. The pressure is controlled by 208a and 208b. The length of the stroke that delivers the adhesive is dialed in using the stroke caliper 210. The pistons that deliver the adhesive are in piston assembly 204, which can generate pressures, up to 1200 psi.

Figure 12:
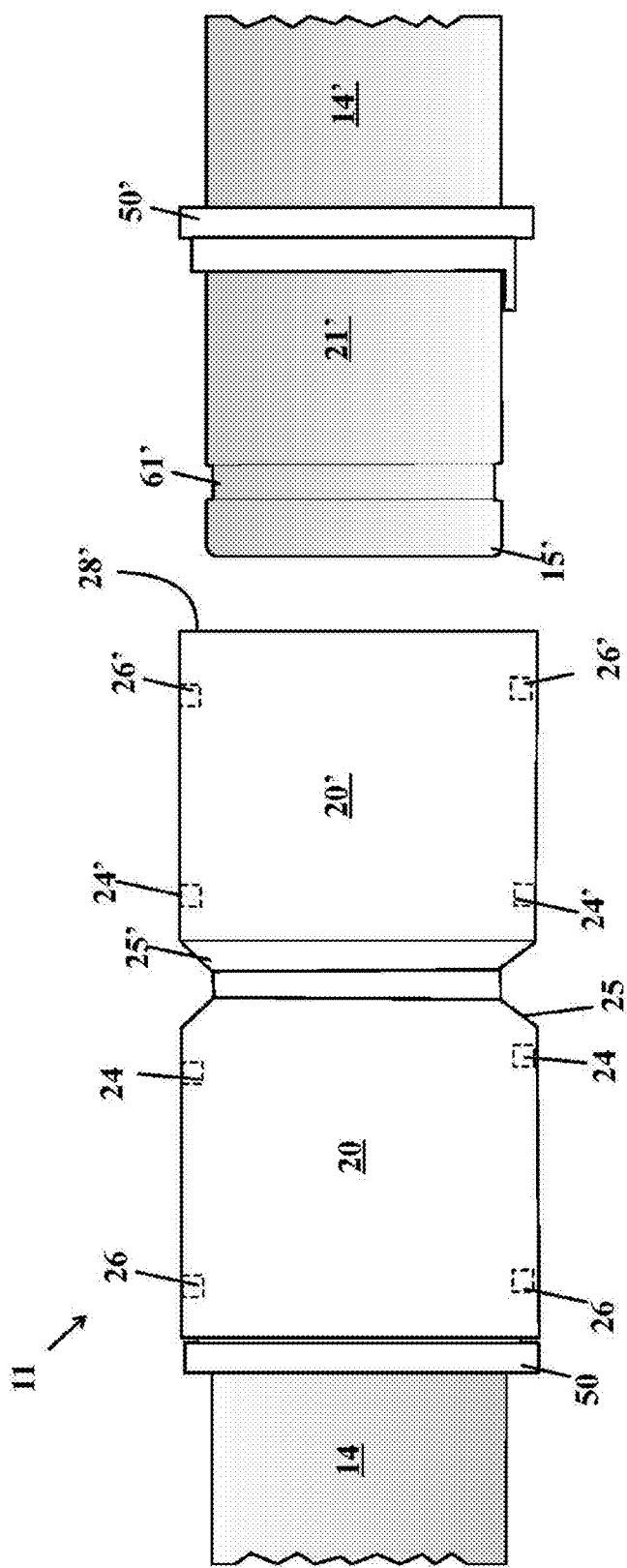
FIG. 12 is a side view a coupling joint, where two sockets are coupled, and each socket is joined to, a pipe.

FIG. 12 is a side view of a coupling joint 11, where two sockets are coupled, and each socket can be joined to a pipe. The coupling joint 11 includes an extrudable adhesive (not shown); a first socket 20 having an inside diameter, where the first socket has a mouth with a rim (not visible), a self-centering bottom 25, a plurality of ports 24,26 and a first inner annular channel (not visible). There is also a second socket 20' having an inside diameter, where said second socket has a second mouth with a rim 28', a second self-centering bottom 25', a plurality of ports 24',26', a second inner annular channel (not visible). The first and second sockets (20 and 20') are coupled at an angle from 45 to 180 degrees. Additionally, there is a pipe 14 having an insertion section (not visible) with a squared-off end and a first rolled groove (not visible). The pipe 14 has an outside diameter that is less than the inside diameter of the first socket, where the difference in diameters defines a first coaxial cavity with a first width. There is also a second pipe 14' having an insertion section 21' with a squared-off end and a rolled groove 61', where the second pipe 14' has a second outside diameter that is less than the inside diameter of the second socket 20", where the difference in diameters defines a second coaxial cavity with a second width, where the second rolled groove 61' lines up with opposing the second inner annular channel 62' (not shown), therein forming a second distribution channel/retaining ring (not shown). There is first flanged annular ring 50, where said first flanged annular ring has a first inside diameter that enables it to be slid over the first pipe 14 and a thickness that is comparable to the first width, and where the first flange has a first flange width that is sufficient to cap the mouth of the first socket. There is a second flanged annular ring 50', where said second annular ring has a second inside diameter that enables it to be slid over the second pipe and a thickness 54" that is comparable to the second width, and where the second, flange has a second flange width that is sufficient to cap the mouth of the second socket 20'. When the coupling joint 11 is fully formed, the adhesive has changed to a solid material that substantially fills the coaxial cavity and the first distribution channel/retaining ring. When other end of the coupling joint 11 is fully formed, the adhesive has changed to a solid material that substantially fills the gap and the distribution channel/retaining ring.

The extruded adhesive can be injected from cartridge or bulk metering and mixing application systems, including bulk refillable types that are freestanding or portable systems (including backpack systems). Mixing apparatus include dynamic mechanical mixers as well as static mixers. The application system includes an apparatus for quickly connecting, delivering an extruded adhesive to an unadhered pre-assembled joint, and disconnecting after delivering a desired quantity of adhesive. It is anticipated that pressures in excess of 1000 psi may be generated, and mechanical assistance will be required for some joints. It is further anticipated that most of the pipe joints will be formed in the field.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. A pipe joint, said joint comprising:
    an extrudable adhesive that solidifies on curing or cooling;
    a first pipe having a socket with an inside diameter, where said socket has a substantially cylindrical wall with a plurality of ports, a mouth with a rim, a self-centering bottom with a seated gasket, and an inner annular channel in fluid communication with one or more of the ports;
    a second pipe having an insertion section with a squared end and a rolled groove, where said insertion section of the second pipe is held in compression against the gasket in the socket of the first pipe, said second pipe having an outside diameter that is less than the inside diameter of the socket, where the difference in diameters defines a coaxial cavity having a second width that is a bond line of the adhesive adhering the insertion section to the socket, and where the rolled groove of the second pipe is substantially opposing the inner annular channel of the socket, such that taken together the rolled groove and inner annular channel are in fluid communication with the coaxial cavity and function as a distribution channel for the adhesive while it is a liquid and that when it is a solid the distribution channel functions as a retaining ring preventing movement of the second pipe relative to the socket; and
    a flanged annular ring where said annular ring has an inside diameter that enables it to slide over the second pipe, an annular ring portion with a thickness that is comparable to the second width of the coaxial cavity and compressed into the cavity, and a flange portion with, a flanged width that is sufficient to cap the rim of the socket, wherein the annular ring portion comprises:
        an outside circular protrusion that frictionally engages the inside diameter of the socket of the first pipe; and
        an inside circular protrusion that frictionally engages the outside diameter of the second pipe;
        where the outside and the inside protrusions help hold the second pipe compressed against the seated gasket.

2. The pipe joint according to claim 1, wherein prior to delivering the extrudable adhesive, elements of an unadhered pipe joint are pre-assembled, held in compression by an apparatus.

3. The pipe joint according to claim 2, wherein the compressive apparatus is a temporary clamp that engages the flanged annular ring and the first and second pipe, compressing the insertion end of the second pipe against the bottom of the socket and the flanged annular ring in the coaxial cavity, prior to and at least as long as the adhesive is extruded into the joint, where said temporary clamp is comprised of an adjustable split-clamp and a screw clamp, where said temporary clamp can be removed when the adhesive has solidified.

4. The pipe joint according to claim 2, wherein the compressive apparatus is a disposable clamp comprised of at least one rubber collar cinched around the second pipe, a second collar comprised of a strap cinched around the first pipe, and a plurality of offset cable straps looped around the first and second collar, that are tensioned to attain the desired level of compression.

5. The pipe joint according to claim 4, wherein the disposable clamp can be quickly attached, adjusted and removed by cutting or releasing the cable straps.

6. The pipe joint according to claim 2, wherein said extrudable adhesive is delivered using a delivery system capable of pumping and mixing one or more parts.

7. The pipe joint according to claim 6, wherein said delivery system comprises cartridge or bulk metering and mixing application systems, including bulk refillable types that are freestanding or portable systems (including backpack systems), mixing apparatus including dynamic mechanical mixers and static mixers; where the delivery system has apparatus for quickly connecting, extruding the extruded adhesive to a unadhered pre-assembled joint, and disconnecting after delivering a desired quantity of adhesive at a desired rate and pressure.

8. The pipe joint according to claim 1, wherein said annular ring portion further comprises:
an extension of the annular portion, which can be rotated so as to function as a shut-off valve for a port.

9. The pipe joint according to claim 1, wherein the joint is fully formed when the extrudable adhesive has changed to a solid material that substantially fills the coaxial cavity and the distribution channel, such that the pipes are adhered and, where the solid adhesive mechanically functions as a retaining ring, such that that even under conditions where there would be adhesive shear failure, the pipes may still remain joined, and the joint continues to sealedly function.

10. A pipe joint, said joint comprising:
an extrudable adhesive that solidifies on curing or cooling;
a first pipe having, a socket with an inside diameter, where said socket has a substantially cylindrical wall with a plurality of ports, a mouth with a rim, a self-centering bottom with a seated gasket, and an inner annular channel in fluid communication with one or more ports;
a second pipe having an insertion section with a squared end and a rolled groove, where said insertion section of the second pipe is inserted into the socket of the first pipe, said second pipe having an outside diameter that is less than the inside diameter of the socket, where the difference in diameters defines a coaxial cavity having a width that is a bond line of the adhesive adhering the insertion section to the socket, and where the rolled groove of the second pipe is substantially opposing the inner annular channel, of the socket, such that taken together the rolled groove and inner, annular channel are in fluid communication with the coaxial cavity and function as a distribution channel for the adhesive while it is a liquid and that when it is a solid the distribution channel functions as a retaining ring preventing movement of the second pipe relative to the socket, and
a flanged annular ring, where said annular ring has an inside diameter that enables it to slide over the second pipe, an annular ring portion with a thickness that is comparable to the width of the coaxial cavity and compressed into the cavity, and a flange portion with a flanged width that is sufficient to cap the rim of the socket, wherein said annular ring portion further comprises:
an outside circular protrusion that frictionally engages the inside diameter of the socket of the first pipe; and
an inside circular protrusion that frictionally engages the outside diameter of the second pipe;
where the outside and the inside protrusions help hold the second pipe compressed against the seated gasket;
where said pipe joint is comprised of an olefinic pipe material having a low surface energy and excellent resistance to solvents.

11. The pipe joint according to claim 10, wherein the extrudable adhesive is, selected from the group consisting of hot melt adhesives, cyanoacrylate adhesives, epoxy adhesives, urethane adhesives, alkyl borane adhesives, free radical and high solids adhesives.

12. The pipe joint according to claim 11, wherein the extrudable adhesive is an alkyl borane two part adhesive.

13. The pipe joint according to claim 12, wherein said alkyl borane adhesive is comprised of an organo borane in conjunction with acrylic oligomers, diluents, and monomers suitable for joining olefinic pipe.

14. The pipe joint according to claim 10, wherein prior to delivering the extrudable adhesive, elements of an unadhered pipe joint are pre-assembled, and held in compression by a compressive apparatus.

15. The pipe joint according to claim 14, wherein the compressive apparatus comprises cable straps.

16. A coupling joint, said joint comprising:
an extrudable adhesive that solidifies on being extruded;
a first socket having an inside diameter, where said first socket has a substantially cylindrical wall with a plurality of ports, a mouth with a rim, a self-centering bottom with a seated gasket, and an inner annular channel in fluid communication with one or more ports;
a second socket having an inside diameter, where said second socket has a substantially cylindrical second wall with a second plurality of ports, a second mouth with a rim, a self-centering second bottom with a seated gasket, and an second inner annular channel in fluid communication with one or more ports;
wherein said first and second sockets axe coupled end-to-end at an angle from 45 to 180 degrees;
a first pipe having a first insertion section with a first end and a first rolled groove, where said first insertion section of the first pipe is inserted into the open end of the first socket, said first pipe having an outside diameter that is less than the inside diameter of the first socket, where the difference in diameters defines a first coaxial cavity having a width that is a bond line of the adhesive adhering the first insertion section to the first socket, and where the rolled groove of the second pipe is substantially opposing the inner annular channel of the socket, such that taken together the rolled groove and inner annular channel are in fluid communication with the coaxial cavity and function as a distribution channel for the adhesive while it is a liquid and that when it is a solid the distribution channel functions as a retaining ring preventing movement of the second pipe relative to the socket;
a second pipe having a second insertion section with a second end and a second rolled groove, where said second insertion section of the second pipe is inserted into the open end of the second socket, said second pipe having an outside diameter that is less than the inside diameter of the second socket, where the difference in diameters defines a second coaxial cavity having a width that is a bond line of the adhesive adhering the second insertion section to the second socket, and where the rolled groove of the second pipe is substantially opposing the inner annular channel of the second socket, such that taken together the rolled groove and inner annular channel are in fluid communication with the second coaxial cavity and function as a second distribution channel for the adhesive while it is a liquid and that when it is a solid the second distribution channel functions as a retaining ring preventing movement of the second pipe relative to the second socket;
a first flanged annular ring, where said first annular ring has a first inside diameter that enables it to slide over the first pipe and a first thickness that is comparable to the first width, and where the first annular ring has an annular ring portion and a first flange, the first flange has a first flange width that is sufficient to cap the first mouth of the first socket, wherein said first annular ring portion comprises an extension that can be rotated so as to function as a shut-off valve for one of the first socket ports;

a second flanged annular ring, where said second annular ring has a second inside diameter that enables it to slide over the second pipe and a second thickness that is comparable to the second width, and where the second annular ring has an annular ring portion and a second flange, the second flange has a second flange width that is sufficient to cap the second mouth of the second socket, wherein said second annular ring portion comprises an extension that can be rotated so as to function as a shut-off valve for one of the second socket ports;

a compression apparatus that secures the coupling joint compressing the first insertion section against the first socket bottom and compressing the second insertion section insertion section against the second socket second bottom for at least as long the extrudable adhesive is being extruded into the coupling joint and until the adhesive has solidified; and wherein, said coupling joint is fully formed after the adhesive solidifies, therein forming a first and second retaining ring in the coupling joint.

17. The coupling joint according to claim 16, wherein prior to delivering the extrudable adhesive, elements of an unadhered pipe joint are pre-assembled, held in compression by the compression apparatus, the compression apparatus is a temporary clamp.

18. The pipe joint according to claim 17, wherein the compression apparatus is comprised of cable straps.

19. A pipe joint, said joint comprising:

an extrudable adhesive that solidifies on curing or cooling;

a first pipe having a socket with an inside diameter, where said socket has a substantially cylindrical wall with a plurality of ports, a mouth with a rim, a self-centering bottom with a seated gasket, and an inner annular channel in fluid communication with one or more of the ports;

a second pipe having an insertion section with a squared end and a rolled groove, where said insertion section of the second pipe is held in compression against the gasket in the socket of the first pipe, said second pipe having an outside diameter that is less than the inside diameter of the socket, where the difference in diameters defines a coaxial cavity having a second width that is a bond line of the adhesive adhering the insertion section to the socket, and where the rolled groove of the second pipe is substantially opposing the inner annular channel of the socket, such that taken together the rolled groove and inner annular channel are in fluid communication with the coaxial cavity and function as a distribution channel for the adhesive while it is a liquid and that when it is a solid the distribution channel functions as a retaining ring preventing movement of the second pipe relative to the socket; and a flanged annular ring where said annular ring has an inside diameter that enables it to slide over the second pipe, an annular ring portion with a thickness that is comparable to the second width of the coaxial cavity and compressed into the cavity, and a flange portion with, a flanged width that is sufficient to cap the rim of the socket, wherein said annular ring portion comprises an extension that can be rotated so as to function as a shut-off valve for one of the ports.

\* \* \* \* \*

UNITED STATES PATENT AND TRADEMARK OFFICE
CERTIFICATE OF CORRECTION

| | | |
|---|---|---|
| PATENT NO. | : 8,746,747 B2 | Page 1 of 1 |
| APPLICATION NO. | : 13/286028 | |
| DATED | : June 10, 2014 | |
| INVENTOR(S) | : McPherson | |

It is certified that error appears in the above-identified patent and that said Letters Patent is hereby corrected as shown below:

In the Claims:

Column 13, Claim 10, Line 42: correct "channel, of the"
                         to read -- channel of the --

Column 14, Claim 16, Line 29: correct "sockets axe coupled"
                         to read -- sockets are coupled --

Column 16, Claim 19, Line 18: correct "the roiled groove"
                         to read -- the rolled groove --

Signed and Sealed this
Twenty-fifth Day of November, 2014

Michelle K. Lee
*Deputy Director of the United States Patent and Trademark Office*